(No Model.) 2 Sheets—Sheet 1.

A. R. MONTGOMERY.
CORN SHELLER.

No. 388,062. Patented Aug. 21, 1888.

ATTEST.
Robert G. Wells
Walter S. Lower

INVENTOR.
Alexis R. Montgomery (No Model.) 2 Sheets—Sheet 2.
A. R. MONTGOMERY.
CORN SHELLER.
No. 388,062. Patented Aug. 21, 1888.
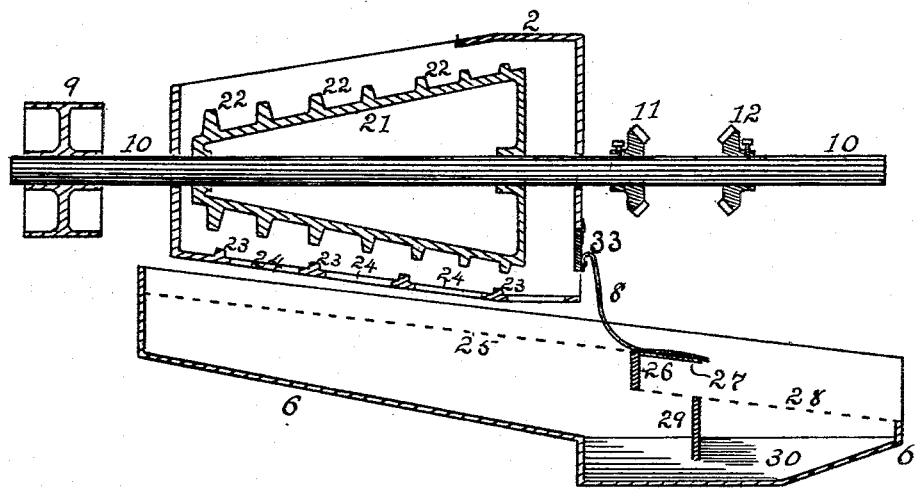
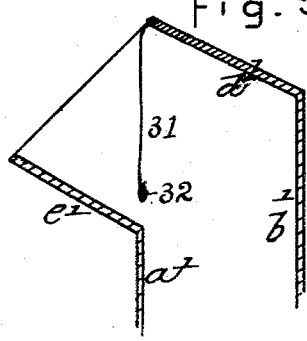
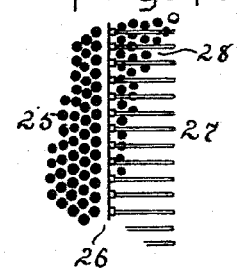
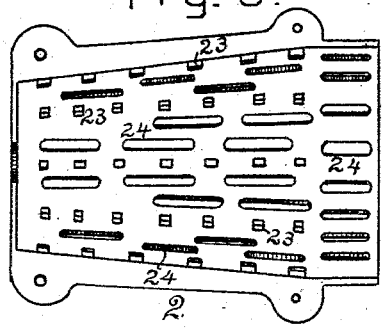
ATTEST.
Robert G. Wells.
Walter S. Lower.
INVENTOR.
Alexis R. Montgomery.

UNITED STATES PATENT OFFICE.

ALEXIS R. MONTGOMERY, OF DECATUR, ILLINOIS.

CORN-SHELLER.

SPECIFICATION forming part of Letters Patent No. 388,062, dated August 21, 1888.

Application filed October 5, 1887. Serial No. 251,541. (No model.)

*To all whom it may concern:*

Be it known that I, ALEXIS R. MONTGOMERY, of the city of Decatur, county of Macon, and State of Illinois, have invented certain new and useful Improvements in Corn-Shellers, of which the following is a specification.

My invention relates to corn-shellers; and it consists in certain combinations, details of construction, and relative arrangement of parts, as hereinafter set forth in detail and specifically claimed.

Figure 1:
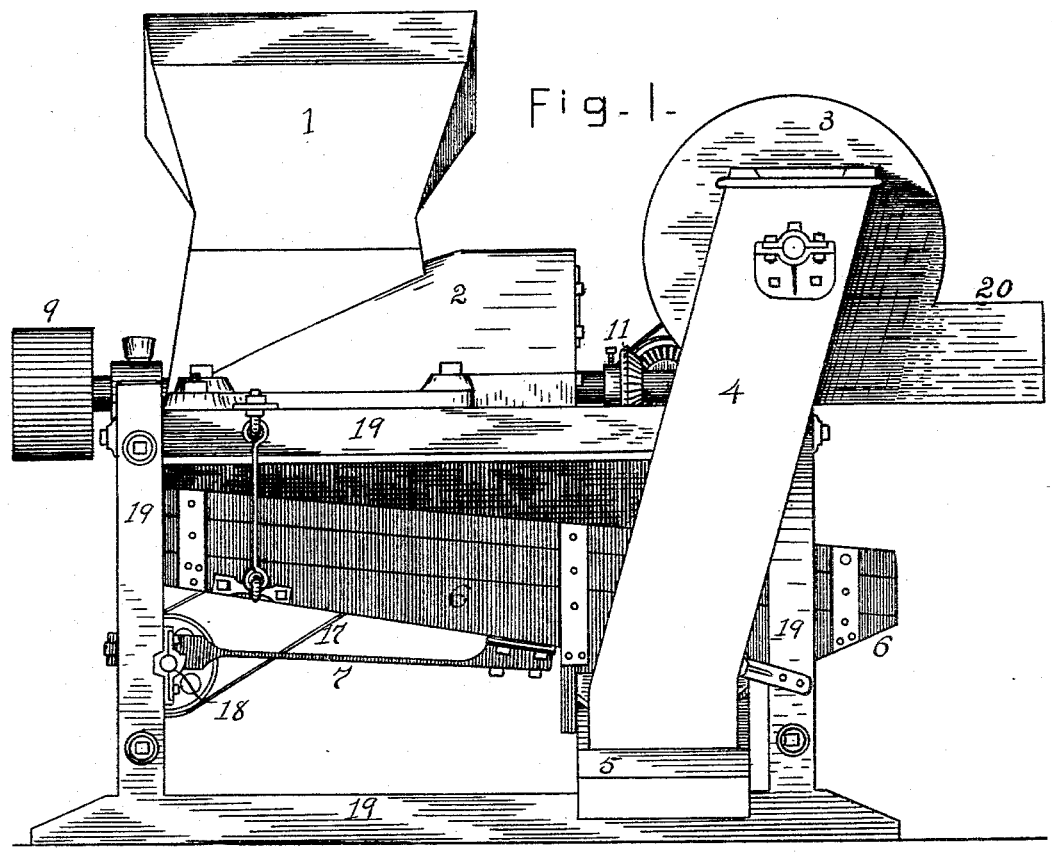
Figure 2:
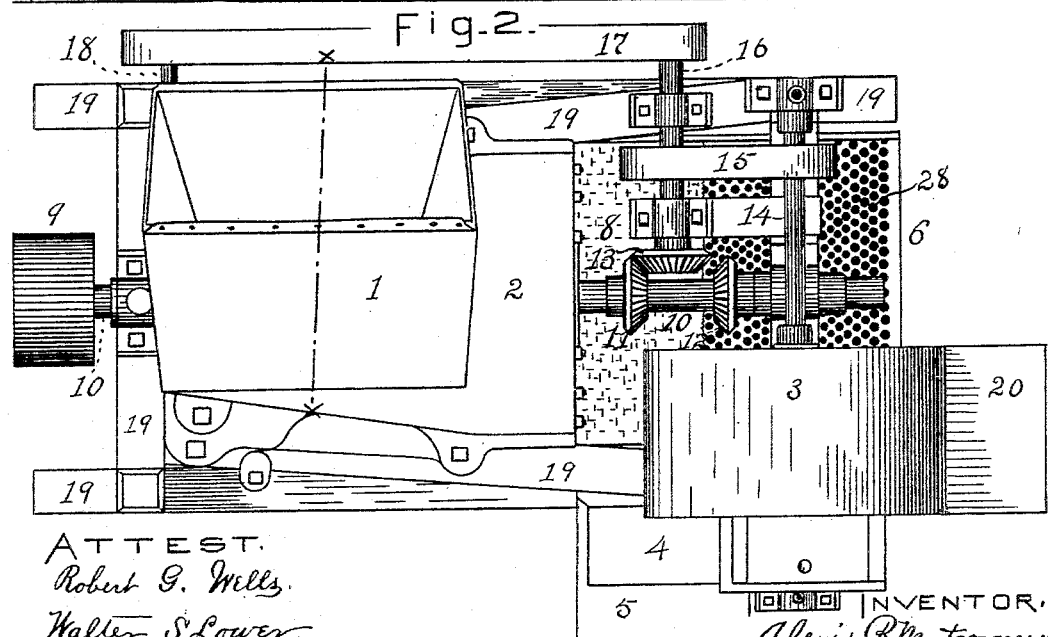

In the drawings accompanying and forming a part of this specification, Figure 1 is a side elevation, and Fig. 2 a plan, of a machine embodying my improvements. Fig. 3 is a central vertical section lengthwise of the sheller-cone, the casing, and the screen. Fig. 4 is a plan of a fragment of the screen. Fig. 5 is a vertical section of the receiving-hopper on dotted line $x$ in Fig. 2, and Fig. 6 is a plan of the lower half of the cone-casing.

The hopper, which has peculiarities of construction to be hereinafter noted, is designated by reference-numeral 1. The casing of the shelling-cone is designated by 2.

3 indicates the casing of an ordinary suction-fan.

4 is an air-duct that connects the suction-fan with the discharge-chute 5 of the sheller. Frame 6 is swung under the shelling-cone and is reciprocated by bar 7, which is actuated by a crank in shaft 18. The gearing comprises the main shaft 10, the intermediate shaft, 16, the fan-shaft 14, and the screen-reciprocating shaft 18, together with their connecting wheels and belts. Shaft 10 is longitudinal of the frame 19, shafts 16, 14, and 18 being transverse. The intermediate shaft, 16, has a bevel-pinion, 13, that is adapted to mesh with either of the shifting-pinions 11, 12 of the main shaft. Band 15 connects a wheel on the fan-shaft with a wheel on the intermediate shaft. Band 17 connects a wheel on the screen-reciprocating shaft with a wheel on the intermediate shaft.

The power-receiving wheel of the main shaft is shown at 9 on the main shaft 10.

The shelling-cone 21 is secured to the main shaft and extended entirely under the hopper-opening. Its taper is more abrupt than the taper of the casing, and it is provided with teeth 22, terminating in a plane approximately parallel with the casing. The lower part of the cone-casing is provided with teeth 23 and slots 24.

Frame 6 contains screen 25, extending from the upper end of the frame to a point somewhat below the termination of the cone-casing, where it rests on cross-bar 26, which forms an offset, and extending from the bottom of the offset to the lower end of the frame is screen 28. Screen-bars 27 lie in line with screen 25 and project from the offset over screen 28. Transverse partition 29, under screen 28, is undercut to permit passage of corn, and the bottom 30 of the lower termination of frame 6 is inclined sidewise toward the discharge-spout 5. A swinging door, 33, is at the lower portion of the discharge end of the cone-casing, and extending from said door to screen 25, at a point near the lower termination thereof, is flexible flap 8.

The hopper comprises the inclined receptacle $e'\,d'$ and the vertical neck $a'\,b'$. Depending from $d'$ in approximate alignment with $a'$ is flexible flap 31, carrying weight 32.

As corn is fed to the hopper it forces flap 32 inward to an extent sufficient to permit passage and falls in direct contact with the large teeth on the small end of the cone. The centrifugal force of the cone carries the corncobs and unshelled corn gradually toward the large end of the casing, the violence of the action of the cone diminishing as smaller teeth are reached. The shelled corn passes at once through slots 24, and the cobs are forced out under door 33 and flap 8. During the operation of shelling the shelled corn has been prevented from being thrown out of the hopper by flap 31, which is sufficiently unyielding to retain the same. After passing from the sheller the corn is subjected to screen 25 and in great part separated from the cobs thereby. In passing from the screen 25 cobs and other refuse are held temporarily on rods 27 with the result that all grains of corn adhering thereto fall onto the clean screen-surface below. The cobs and other refuse pass from rods 27 over screen 28 and out of the machine. The corn passes down incline 30 to chute 5, through which it is discharged and in which it is subjected to the cleaning action of the fan, which projects the cleanings through vent 20.

The gearing permits the various parts to be compactly arranged in desirable positions, and the direction of the rotation of the intermediate shaft to be readily adapted to a change in the direction of the rotation of the main shaft. The latter peculiarity enables connections to be made with wheels running in either direction, and also permits the direction of the rotation of the cone to be reversed occasionally in order that the wear on the teeth may not all be on one side.

The single truncated cone provided with teeth increasing in size toward the smaller end and extended under the hopper forms an effective sheller that is not liable to break cobs, as do beaters on a shaft. The operation of the larger teeth is more violent and rapid, that of the smaller teeth more thorough and slow, and the change from one to the other is gradual and calculated to give best results.

The flap in the hopper retains the shelled corn, while permitting a free feed, as has been already explained. The flap 8 compels the cobs and other refuse to pass over the rods, and tends to retain the same thereon until the corn is completely separated therefrom.

I claim as new and desire to secure by Letters Patent—

1. In corn-shellers, in combination, the longitudinal main shaft carrying the shelling-cone, the transverse intermediate shaft geared with the main shaft, the transverse fan-shaft, and the transverse screen-reciprocating shaft, power-transmitters connecting the fan and screen shafts with the intermediate shaft, as and for the purpose set forth.

2. In corn-shellers, in combination, the longitudinal shaft carrying the shelling-cone and having the shifting bevel-wheels, the transverse intermediate shaft having a gear-pinion adapted to mesh with either of the shifting-wheels, the transverse fan-shaft and the transverse screen-reciprocating shaft, power-transmitting bands connecting the fan and screen shafts with the intermediate shaft, as and for the purpose set forth.

3. In a screen for corn-shellers, in combination, screen-sheet 25, terminating on transverse offset 26, screen-sheet 28, extending from the bottom of the offset in a line approximately parallel with a continuation of sheet 25, rods 27, projected over sheet 28 in line with sheet 25, and flexible flap 8, affixed to the sheller-casing and resting in part on the rods, as and for the purpose set forth.

ALEXIS R. MONTGOMERY.

Attest:
I. D. WALKER,
L. P. GRAHAM.